(12) United States Patent
Matsuda

(10) Patent No.: US 11,985,277 B2
(45) Date of Patent: May 14, 2024

(54) IMAGE FORMING APPARATUS AND REMOTE OPERATION CONTROL METHOD

(71) Applicant: SHARP KABUSHIKI KAISHA, Sakai (JP)

(72) Inventor: Chikara Matsuda, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

(21) Appl. No.: 17/669,811

(22) Filed: Feb. 11, 2022

(65) Prior Publication Data

US 2022/0263958 A1 Aug. 18, 2022

(30) Foreign Application Priority Data

Feb. 15, 2021 (JP) ................................ 2021-021531

(51) Int. Cl.
| | |
|---|---|
| G06F 3/048 | (2013.01) |
| G06F 3/0484 | (2022.01) |
| G06F 3/04886 | (2022.01) |
| H04N 1/00 | (2006.01) |

(52) U.S. Cl.
CPC ....... *H04N 1/00411* (2013.01); *G06F 3/0484* (2013.01); *G06F 3/04886* (2013.01); *H04N 1/00472* (2013.01)

(58) Field of Classification Search
CPC .............. G06F 3/0484; G06F 3/04886; H04N 1/00411; H04N 1/00472
See application file for complete search history.

(56) References Cited

U.S. PATENT DOCUMENTS

| | | | | |
|---|---|---|---|---|
| 2005/0275729 | A1* | 12/2005 | Billerbeck | H04N 23/661 348/222.1 |
| 2010/0011299 | A1* | 1/2010 | Brodersen | H04L 67/75 715/740 |
| 2011/0252372 | A1* | 10/2011 | Chaudhri | G06F 3/0486 715/835 |
| 2015/0256593 | A1* | 9/2015 | Kelani | G06F 3/04883 715/740 |

FOREIGN PATENT DOCUMENTS

JP 2005-323093 A 11/2005

* cited by examiner

*Primary Examiner* — Claudia Dragoescu
(74) *Attorney, Agent, or Firm* — ScienBiziP, P.C.

(57) ABSTRACT

According to an embodiment, an image forming apparatus includes a display which displays an operation screen; a communicator which transmits and receives data or a signal to and from a terminal device; and a controller which transmits, in accordance with execution by the communicator of transmitting data on the operation screen to the terminal device, and receiving an operation event signal generated by the terminal device, an activation signal which activates an input function to the terminal device when the operation event signal indicates an operation related to an input field.

12 Claims, 16 Drawing Sheets

IMAGE FORMING APPARATUS AND REMOTE OPERATION CONTROL METHOD

BACKGROUND OF THE INVENTION

Field of the Invention

The present invention relates to, for example, an image forming apparatus to be operated remotely.

Description of the Background Art

In recent years, a technology to use a device such as smartphones, tablets, and PCs to remotely operate another device has been developed.

Japanese Unexamined Patent Application Publication No. 2005-323093 discloses that "in performing a remote operation of a terminal to be operated by using an operation terminal, a screen of the terminal to be operated is displayed on a display of the operation terminal so that an operation is performed by the operation terminal, and an operation signal of the operation is sent to the terminal to be operated via a Web server to have the operation executed at the terminal to be operated".

In the technology of Japanese Unexamined Patent Application Publication No. 2005-323093, a target terminal device is actuated by a remote operation from a terminal device. However, Japanese Unexamined Patent Application Publication No. 2005-323093 does not describe use of an input function, i.e., an input conversion function such as kanji conversion, and a voice input function, for example, of the terminal device. When the target terminal device is an image forming apparatus, a user performs an operation on an operation screen (an operation screen including a software keyboard) of the image forming apparatus that is displayed on the terminal device. However, the input function used is that of the image forming apparatus, and using an input operation function of the operation terminal itself in the remote operation of the image forming apparatus has not been considered.

In view of such circumstances, the present disclosure aims to provide an image forming apparatus and the like in which the use of an input function of a terminal device is enabled in a remote operation of an image forming apparatus using the terminal device.

SUMMARY OF THE INVENTION

The present disclosure is characterized in that an image forming apparatus is provided with: a display which displays an operation screen; a communicator which transmits and receives data or a signal to and from a terminal device; and a controller which transmits, in accordance with execution by the communicator of transmitting data on the operation screen to the terminal device, and receiving an operation event signal generated by the terminal device, an activation signal which activates an input function to the terminal device when the operation event signal indicates an operation related to an input field.

Furthermore, the present disclosure pertains to a remote operation control method for an image forming apparatus which is operated by a terminal device, and the method is characterized by including: displaying of displaying an operation screen; communicating of transmitting and receiving data or a signal to and from the terminal device; and controlling of transmitting, in accordance with the communicating of transmission of data on the operation screen to the terminal device, and reception of an operation event signal generated by the terminal device, an activation signal which activates an input function to the terminal device when the operation event signal indicates an operation related to an input field.

According to the present disclosure, it is possible to exhibit excellent advantages that the operability when remotely operating the image forming apparatus by using the terminal device is improved, and the input efficiency is also improved, and that and there is no need to provide the input function of the terminal device in the image forming apparatus, and the cost of incorporating such a function can be reduced.

DESCRIPTION OF THE PREFERRED EMBODIMENTS

Embodiments of the present disclosure will be described below with reference to the accompanying drawings. Note that the following embodiments have been presented by way of example for describing the present disclosure, and the technical scope of the invention as recited in the appended claims is not limited by the description given below.

1. First Embodiment

1.1 Configuration of Remote Operation System

Figure 1:
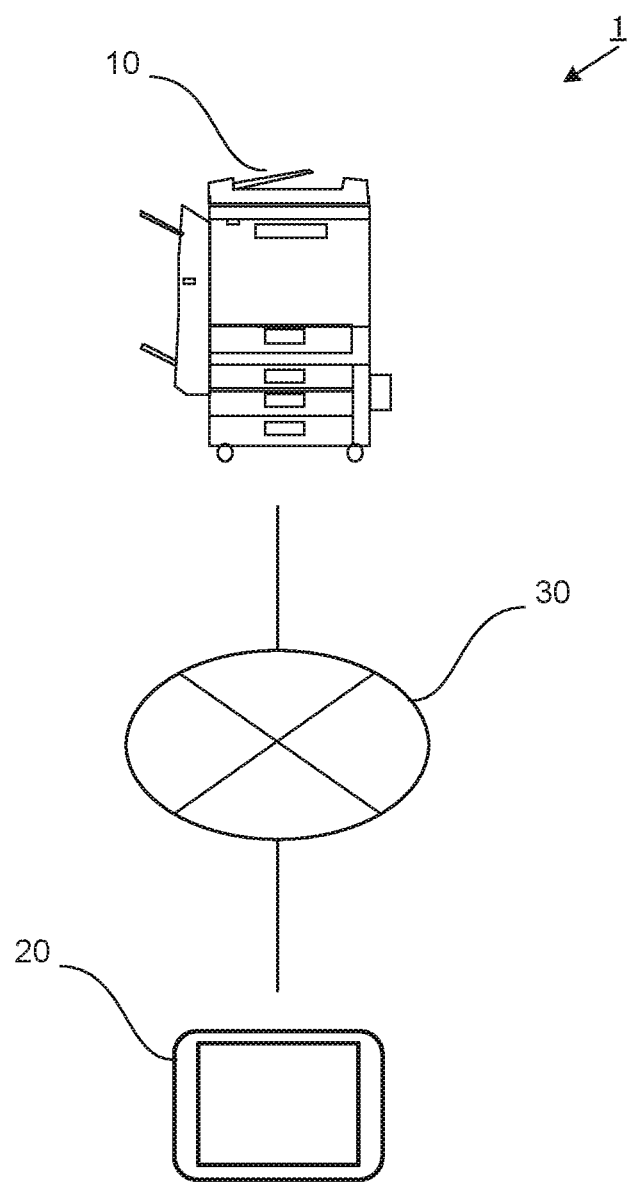
FIG. 1 is an explanatory diagram illustrating a remote operation system for an image forming apparatus according to a first embodiment.

FIG. 1 is an explanatory diagram illustrating a remote operation system for an image forming apparatus according to a first embodiment.

A remote operation system 1 of the first embodiment is provided with an image forming apparatus 10 and a terminal device 20, which are connected to each other via a network 30. The network 30 corresponds to a local area network (LAN) or the Internet, and a connection configuration thereof may either be wired or wireless.

In the remote operation system 1, the terminal device 20 can perform a remote operation of the image forming apparatus 10.

In the remote operation system 1 of the first embodiment, when the image forming apparatus 10 receives a remote operation from the terminal device 20, an input function of the terminal device 20 is used instead of an input function of the image forming apparatus 10, according to an input field.

1.2 Configuration of Each Device

1.2.1 Image Forming Apparatus

Figure 2:
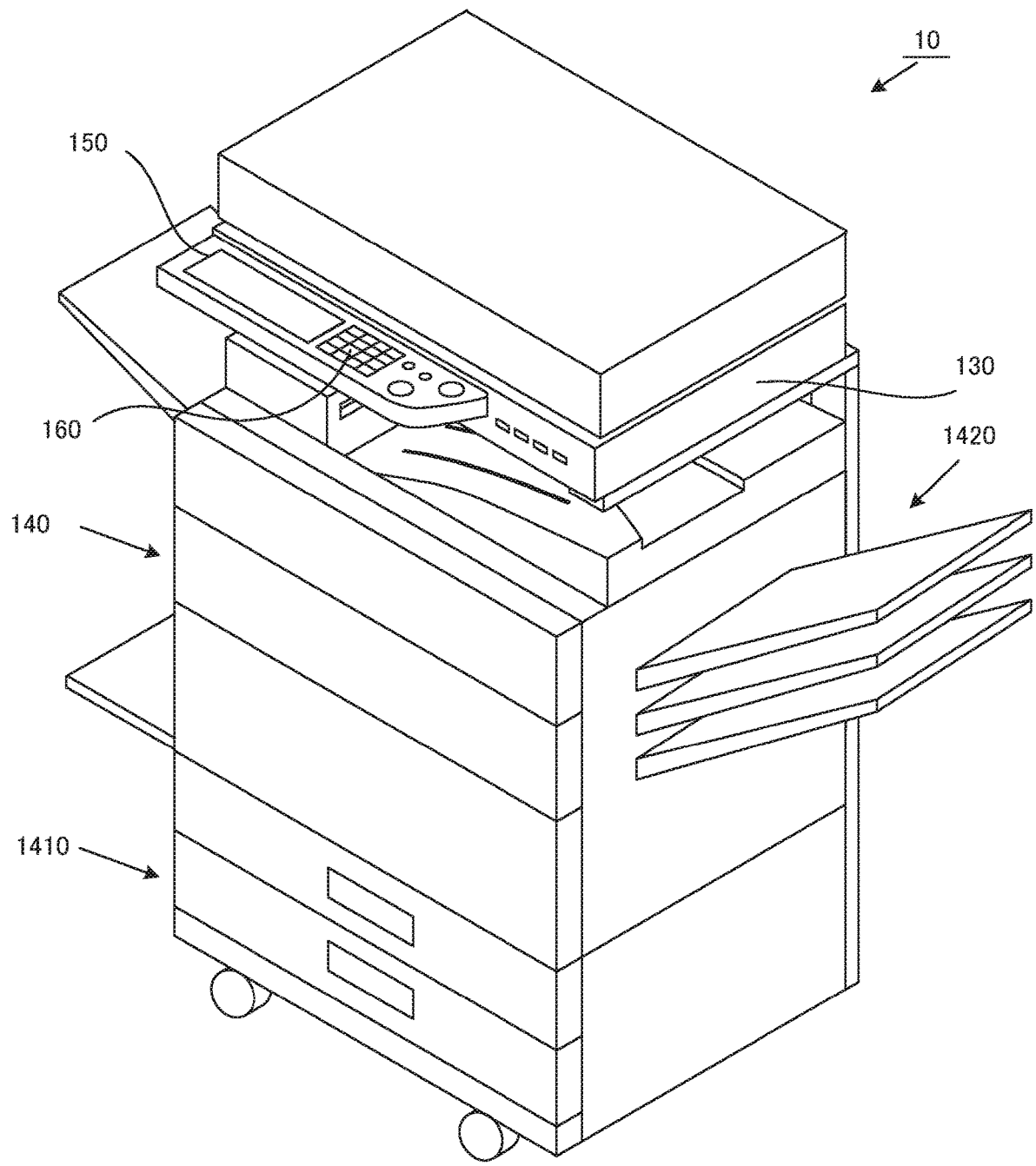
FIG. 2 is an external view showing an image forming apparatus according to the first embodiment.
Figure 3:
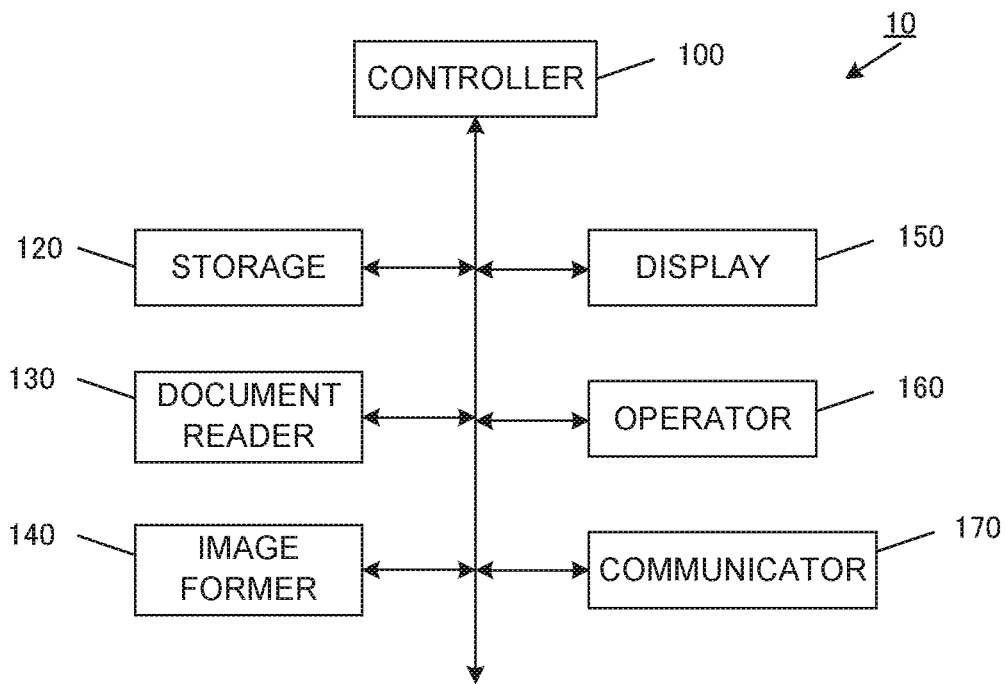
FIG. 3 is a block diagram showing a functional configuration of the image forming apparatus according to the first embodiment.

FIG. 2 is an external view showing the image forming apparatus according to the first embodiment. FIG. 3 is a block diagram showing a functional configuration of the image forming apparatus according to the first embodiment.

The image forming apparatus 10 is, for example, a multifunction peripheral (MFP), and includes a plurality of kinds of modes related to job processing in image forming. The image forming apparatus 10 is provided with a controller 100, a storage 120, a document reader 130, an image former 140, a display 150, an operator 160, and a communicator 170, and executes a job of each mode by operating these elements. In the following, an overview of each mode will be described.

A job processing mode is a mode that can realize general functions such as copy, fax, and scanner functions. When the image forming apparatus 10 is in a copy mode, a copy job can be executed. When the image forming apparatus 10 is in a fax mode, a fax job can be executed, and when the image forming apparatus 10 is in a scanner mode, a scanner job can be executed.

The copy job will be briefly described below. First, a document is set on the document reader 130, and a copy operation is performed by means of the operator 160. A user can confirm, on the display 150, the set document size, paper size, and copy settings (e.g., settings for single-sided printing, double-sided printing, and aggregate printing).

When the user performs the operation of start through the operator 160, copy processing is executed. Specifically, the document reader 130 reads the document set by the user. The controller 100, which will be described later, generates image data from the document read by the document reader 130.

The image former 140 generates an image based on the image data on a sheet of paper conveyed from a paper tray 1410, and outputs the paper with the image formed thereon to a paper discharge tray 1420. In the present embodiment, the paper refers to a recording sheet or recording paper on which images are formed. The paper includes not only ordinary plain paper, but also various paper media, such as thick paper and glossy paper, and a film or the like that allows an image to be formed thereon.

Next, the fax job will be briefly described below.

When fax transmission is to be performed, a document is set on the document reader 130, and a fax transmission operation is performed by means of the operator 160. The user can confirm the set document size and transmission settings (transmission destination fax number, etc.) on the display 150.

When the user performs the operation of fax start through the operator 160, fax processing is executed. The controller 100, which will be described later, performs procedures for communication with a communication counterpart by means of the communicator 170. Further, when a transmission-enabled state is ensured, the controller 100 performs necessary processing such as changing the compression format of a compressed file, and then performs the processing of sequentially transmitting the compressed file to the communication counterpart via a communication line.

Also, when a fax is to be received, the controller 100 receives the compressed file transmitted from the communication counterpart while performing the procedures for communication by the communicator 170, and applies decompression processing to the received compressed file by a compression/decompression processor not illustrated. Then, various kinds of image processing are applied to image data, and the image data is output to the image former 140. The image former 140 forms an output image on recording paper on the basis of the output image data.

In addition to the fax mode, it is also possible to transmit, as the function of transmitting document image data which has been read, the document image data by e-mail to an address stored in the storage 120.

Next, the scanner job will be briefly described below.

First, a document is set on the document reader 130, and a scanner operation is performed by means of the operator 160. The user can confirm the set document size and output image settings (image file type, etc.) on the display 150.

When the user performs the operation of scan start through the operator 160, scanner processing is executed. Specifically, the document reader 130 reads the document set by the user. The controller 100, which will be described later, generates image data from the document read by the document reader 130.

The image forming apparatus 10 executes various jobs while combining the above-described functions (i.e., the copy function, the fax function, and the scanner function). In doing so, each time the user performs an operation input of the setting for a plurality of setting items of each job, by virtue of an auto-complete function, setting values previously set by operation are automatically extracted from a job operation history and are displayed as a setting history.

As regards the job processing mode of the image forming apparatus, when the user operates the operator 160 to activate a desired job processing mode, the controller 100 of the image forming apparatus 10 causes an initial screen of the activated job processing mode to be displayed on a screen of the display 150. At this time, initial setting values of the setting items are displayed on the initial screen, and the setting values are made changeable through the operator 160.

Next, a functional configuration of the image forming apparatus 10 will be described with reference to FIG. 3.

The controller 100 is a functional part for controlling the image forming apparatus 10 as a whole. The controller 100 implements various functions by reading and executing a control program stored in the storage 120, and is composed of one or more arithmetic devices (for example, a central processing unit [CPU]), and the like. The functions implemented by the controller 100 will be described below.

The controller 100 includes an input operation processing function of performing input operation processing, an image forming processing function of performing image forming processing, and the like. The controller 100 executes the copy function, the fax function, the scanner function, and the like, as the image forming processing function.

The storage 120 is a functional part where a program and data are stored. The storage 120 is constituted of, for example, a semiconductor memory such as a solid state drive (SSD), or a hard disk drive (HDD).

The storage 120 stores a control program and operation screen data.

The control program is a program related to operation control of the image forming apparatus 10, and also performs processing control related to input operations.

The operation screen data is screen data to be displayed for performing an input operation.

The document reader 130 is for reading an image of a document, and is composed of, for example, a scanner device including a device that converts optical information into electrical signals, such as a contact image sensor (CIS) or a charge-coupled device (CCD).

For example, the document reader 130 reads the document placed on a placement table within a range set by the document size. Note that the document may be set on the placement table or may be set on an automatic document feeding device (ADF: Auto Document Feeder).

The image former 140 is a functional part for forming image data on a recording medium (for example, a recording sheet). For example, a recording sheet is fed from the paper tray 1410 of FIG. 2, and after an image has been formed on a surface of the recording sheet in the image former 140, the recording sheet is discharged from the paper discharge tray 1420. The image former 140 is composed of, for example, a laser printer or the like that uses an electrophotographic method.

Also, one or more paper trays 1410 are usually provided to accommodate sheets of paper therein.

The display 150 displays various states of the image forming apparatus 10, and also displays the state of operation input. For example, the display 150 is composed of a liquid crystal display (LCD), an organic EL panel, or an electronic paper using an electrophoretic method.

The operator 160 is a button, a switch, or the like that receives an operation input from the user. The operator 160 may be realized by a hardware input device such as a switch or a keyboard. Alternatively, the operator 160 may be realized by a touch panel or the like that is formed integrally with the display 150. In this case, a method of detecting an input on the touch panel may be any general detection method such as a resistive method, an infrared method, an electromagnetic induction method, and an electrostatic capacitive method.

The operator 160 of the present embodiment is provided with a hardware input device and a touch panel of the display 150, and these elements can be operated individually.

The communicator 170 communicates with other devices. For example, it is sufficient if the communicator 170 includes an interface connectable to a network, and can communicate with another device via a wired/wireless local area network (LAN). Image data may be sent to or received from another device (for example, a universal serial bus [USB] memory stick) via a USB interface or the like. Also, the communicator 170 can be connected to a communication network such as a public network, a local area network (LAN), or the Internet, and a compressed file can be transmitted externally via the communication network by a means of communication such as facsimile or e-mail.

The image forming apparatus 10 may further be provided with a necessary function in addition to the above-described structures. For example, the image forming apparatus 10 may be provided with such a management portion as a billing management portion which allows the image forming apparatus 10 to be used only when a fee is paid by the user.

1.2.2 Terminal Device

Figure 4:
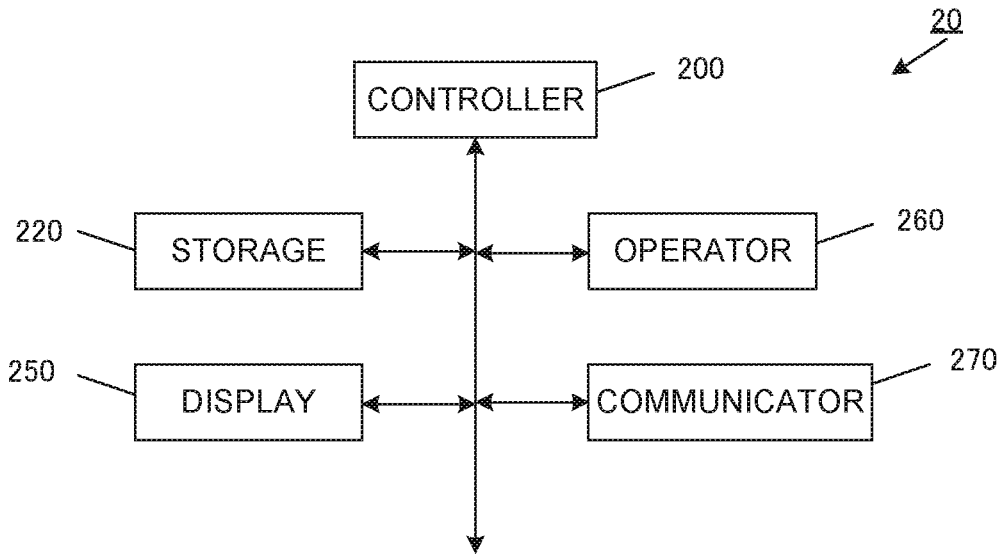
FIG. 4 is a block diagram showing a functional configuration of a terminal device according to the first embodiment.

FIG. 4 is a block diagram showing a functional configuration of a terminal device according to the first embodiment.

The terminal device 20 shown in FIG. 4 is, for example, a personal computer (PC), a notebook PC, a tablet, a smartphone, or the like, and includes a controller 200, a storage 220, a display 250, an operator 260, and a communicator 270. As the terminal device 20 operates each of the elements, the terminal device 20 remotely operates the image forming apparatus 10 connected via the network 30.

The controller 200 is a functional part for controlling the terminal device 20 as a whole. The controller 200 implements various functions by reading and executing a control program stored in the storage 220, and is composed of one or more arithmetic devices (for example, the CPU).

The storage 220 is a functional part where a program and data are stored. The storage 220 is constituted of, for example, a semiconductor memory such as an SSD, or an HDD.

The display 250 displays various states of the terminal device 20, and also displays the state of operation input. For example, the display 250 is composed of a liquid crystal display (LCD) or an organic EL panel or the like.

The operator 260 is a button, a switch, or the like that receives an operation input from the user. The operator 260 may be realized by a hardware input device such as a switch or a keyboard. Alternatively, the operator 260 may be realized by a touch panel or the like that is formed integrally with the display 250. A method of detecting an input on the touch panel may be any general detection method such as a resistive method, an infrared method, an electromagnetic induction method, and an electrostatic capacitive method.

The communicator 270 communicates with other devices via a network. For example, it is sufficient if the communicator 270 includes an interface connectable to a network, and can communicate with another device via a wired/wireless local area network (LAN). The communicator 270 is also adapted to wireless communication such as Bluetooth (registered trademark), Wi-Fi, and NFC, and can communicate with other adaptive devices.

1.3 Flow of Processing

It is assumed that a program for performing a remote operation is installed on the image forming apparatus 10 and the terminal device 20, and passwords and the like necessary for authentication login have been mutually registered. Furthermore, it is assumed that login authentication processing for performing the remote operation is complete. Therefore, a detailed description of the above processing is omitted.

1.3.1 Processing of Image Forming Apparatus

Figure 5:
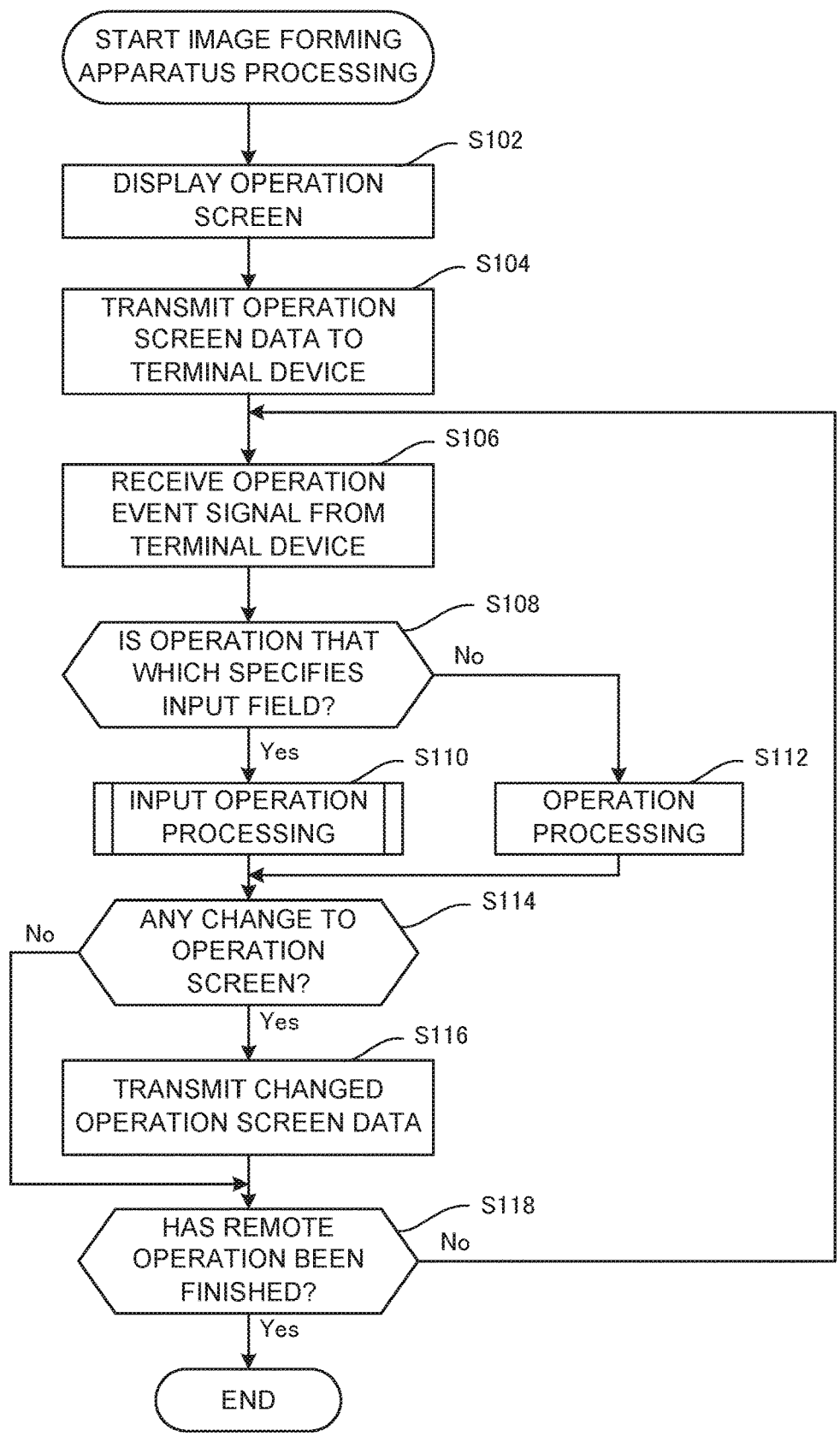
FIG. 5 is a flowchart showing remote operation processing of the image forming apparatus according to the first embodiment.
Figure 6:
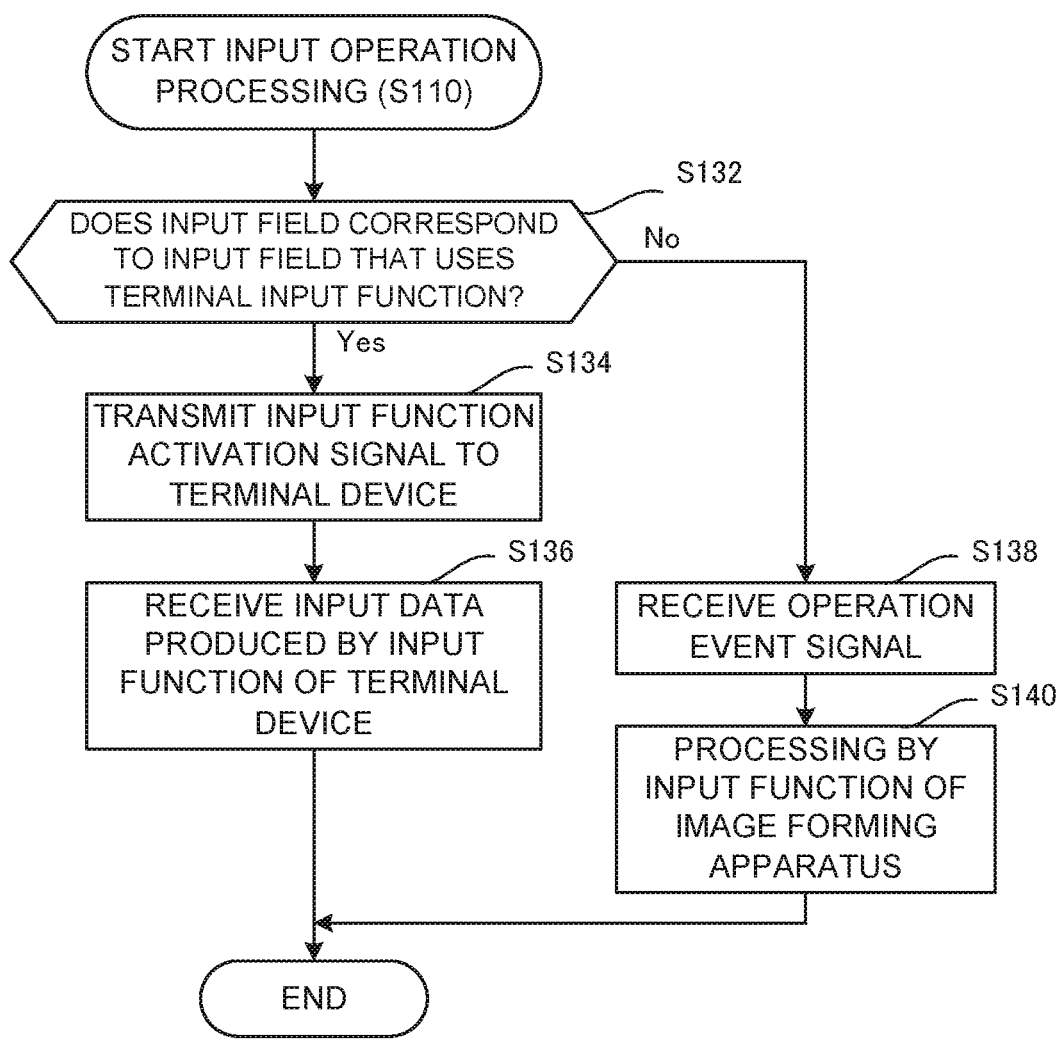
FIG. 6 is a flowchart showing input operation processing of the image forming apparatus according to the first embodiment.

Remote operation processing of the image forming apparatus will be described with reference to FIGS. 5 and 6. FIG. 5 is a flowchart showing the remote operation processing of the image forming apparatus according to the first embodiment. FIG. 6 is a flowchart showing input operation processing of the image forming apparatus according to the first embodiment.

The controller 100 of the image forming apparatus 10 displays an operation screen on the display 150 on the basis of operation screen data stored in the storage 120 (step S102). The controller 100 transmits data on the operation screen displayed on the display 150 to the terminal device 20 via the communicator 170 (step S104). The controller 100 receives an operation event signal generated by the operator 260 from the terminal device 20 (step S106). When the controller 100 has received the operation event signal from the terminal device 20, the controller 100 determines whether the received signal indicates an operation for specifying an input field or indicates an operation other than that (step S108).

If the received signal indicates an operation for specifying an input field (step S108; Yes), the controller 100 executes input operation processing (step S110). If the received signal does not indicate an operation for specifying an input field (step S108; No), the controller 100 executes operation processing based on that operation event signal (step S112). The input operation processing of step S110 will be described later.

The controller 100 determines whether a change has been made to the operation screen (step S114), and if a change has been made (step S114; Yes), the controller 100 stores data on the changed operation screen in the storage 120, and also transmits the data to the terminal device 20 (step S116) to proceed to step S118. If no change has been made (step S114; No), the processing proceeds to step S118.

In step S118, the controller 100 determines whether the remote operation has been finished (step S118), and if the remote operation has not been finished (step S118; No), the processing returns to step S106, whereas if the remote operation has been finished (step S118; Yes), the processing is ended.

When the operation event signal received from the terminal device 20 corresponds to a signal indicating an operation for specifying an input field, the controller 100 determines whether the input field uses an input function of the image forming apparatus 10 or uses an input function of the terminal device 20.

Each input field of the operation screen should be set in advance whether it is an input field that uses the input function of the image forming apparatus or an input field that uses the input function of the terminal device. For example, in the case of selection of each item or numerical input, the input function of the image forming apparatus may be used, and for those items which require character conversion by using an IME (Input Method Editor), the input function of the terminal device (hereinafter referred to as a terminal input function) may be used. Also, use of voice input and handwriting input may be enabled as the terminal input function. For an input of the paper size, for example, the input function may be switched to voice input.

The switching may be performed such that the input function of the image forming apparatus is used if a numerical input is to be made in the input field, and the terminal input function is used if the other input is to be made. Also, depending on the resolution of the terminal device 20 (for example, when the resolution is less than or equal to a predetermined resolution), the terminal input function may be disabled.

Next, referring to FIG. 6, the input operation processing of the image forming apparatus in step S110 shown in FIG. 5 will be described.

The controller 100 determines whether the input field corresponds to an input field that uses the input function of the terminal device 20 (step S132). If the input field is that which uses the terminal input function (step S132; Yes), the controller 100 transmits an input function activation signal to the terminal device 20 (step S134). The controller 100 receives input data produced by the terminal input function from the terminal device 20 via the communicator 170 (step S136).

If the input field is not that which uses the terminal input function (step S132; No), the controller 100 receives an operation event signal from the terminal device 20 via the communicator 170 (step S138), and performs processing by the input function of the image forming apparatus on the basis of the received signal (step S140).

1.3.2 Processing of Terminal Device

Figure 7:
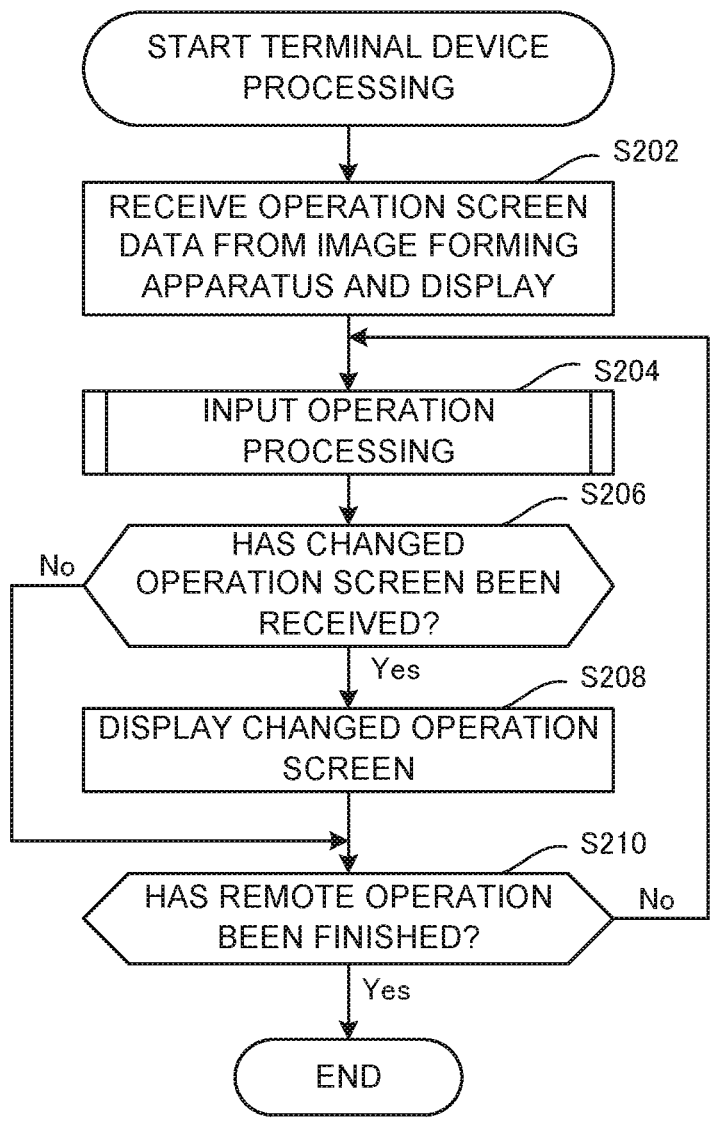
FIG. 7 is a flowchart showing remote operation processing of the terminal device according to the first embodiment.
Figure 8:
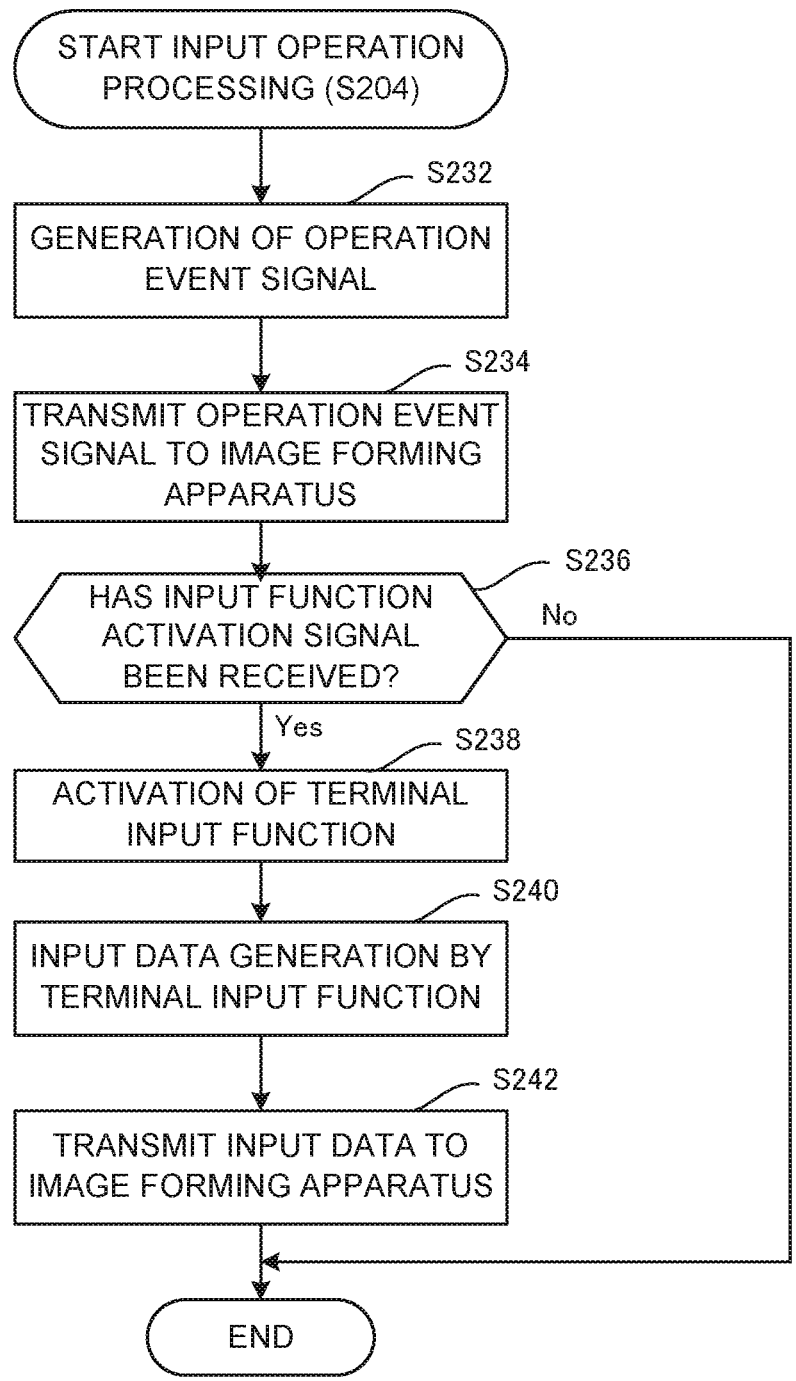
FIG. 8 is a flowchart showing input operation processing of the terminal device according to the first embodiment.

Remote operation processing of the terminal device will be described with reference to FIGS. 7 and 8. FIG. 7 is a flowchart showing the remote operation processing of the terminal device according to the first embodiment. FIG. 8 is a flowchart showing input operation processing of the terminal device according to the first embodiment.

The controller 200 of the terminal device 20 receives operation screen data from the image forming apparatus 10, stores it in the storage 220, and displays an operation screen on the display 250 (step S202). The controller 200 performs input operation processing (step S204). The input operation processing of step S204 will be described later.

The controller 200 confirms whether data on the changed operation screen has been received from the image forming apparatus 10 via the communicator 270 (step S206). If the data has been received (step S206; Yes), the controller 200 stores the data on the changed operation screen in the storage 220, and also displays the operation screen on the display 250 (step S208), and then the processing proceeds to step S210.

If the changed operation screen has not been received (step S206; No), the processing proceeds to step S210.

In step S210, the controller 200 confirms whether the remote operation has been finished, and if it has not been finished (step S210; No), the processing returns to step S204, whereas if it has been finished (step S210; Yes), the remote operation processing is ended.

Next, referring to FIG. 8, the input operation processing of the terminal device in step S204 shown in FIG. 7 will be described.

As a result of the operator 260 of the terminal device 20 having been operated, the controller 200 of the terminal device 20 generates an operation event signal (step S232). The controller 200 transmits the operation event signal to the image forming apparatus 10 via the communicator 270 (step S234).

The controller 200 confirms whether an input function activation signal has been received from the image forming apparatus 10 via the communicator 270 within a predetermined time period (step S236). If the input function activation signal has been received (step S236; Yes), the controller 200 activates the terminal input function (step S238). The controller 200 generates input data by an input operation from the operator 260 with the use of the terminal input function (step S240). Further, the controller 200 transmits the input data to the image forming apparatus 10 via the communicator 270 (step S242).

If no input function activation signal has been received (step S236; No), the input operation processing is completed.

1.4 Operation Example

A specific example of the remote operation processing of the first embodiment will be described on the basis of operation screens of FIGS. 9 to 13. Although a remote operation can be performed in various modes with respect to jobs, here, explanation will be given by taking an example of an input operation screen for entering the subject and a file name in transmission via fax or e-mail.

Figure 9:
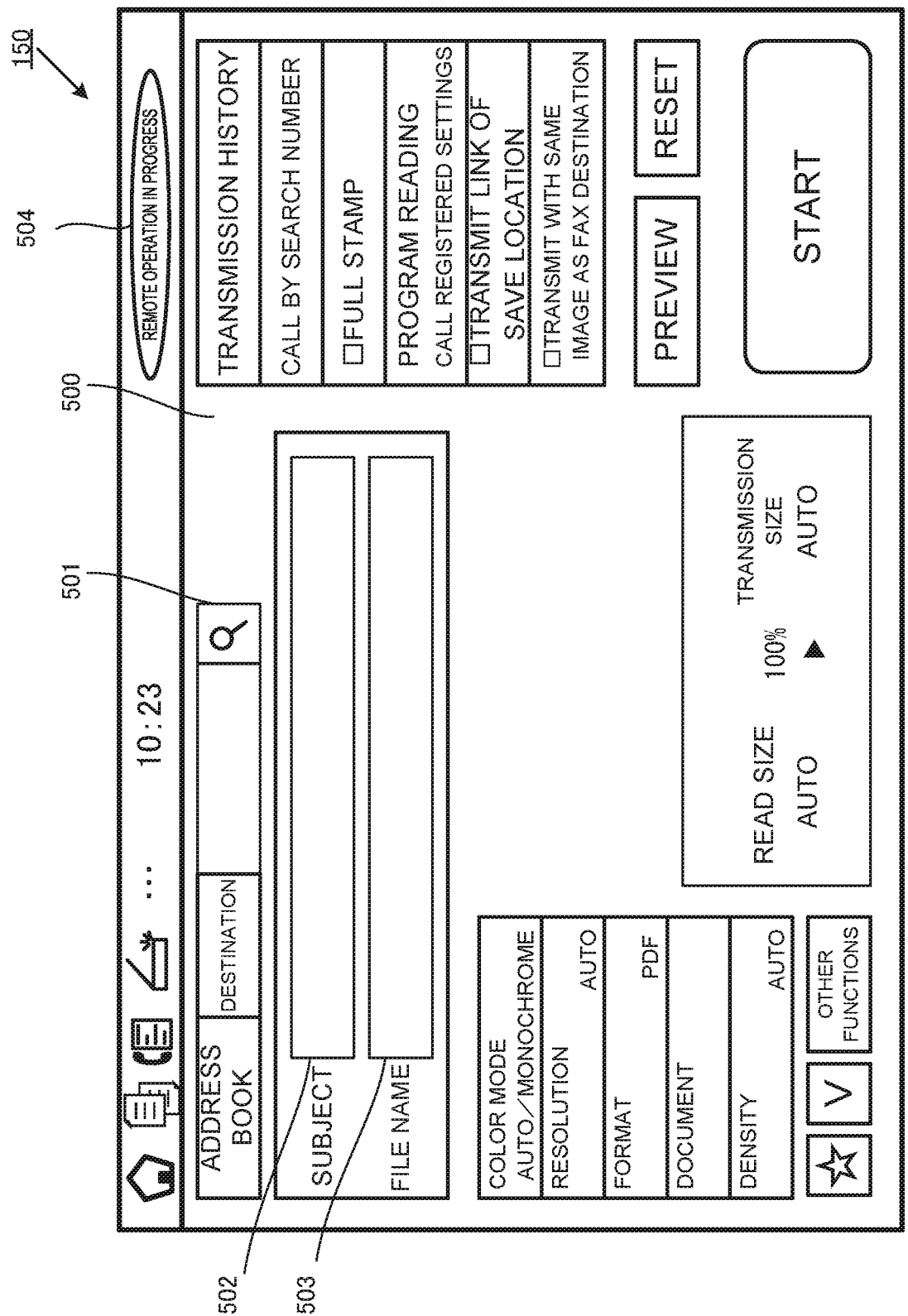
FIG. 9 is an explanatory diagram illustrating an operation screen displayed on a display of the image forming apparatus according to the first embodiment.

As illustrated in FIG. 9, on an operation screen 500 displayed on the display 150 of the image forming apparatus 10, a destination input field 501 of an address book, a subject input field 502, and a file name input field 503 are displayed. Here, the subject input field 502 and the file name input field 503 are set to use the input function of the terminal device 20. When a "Remote operation in progress" display 504 is performed, it is indicated that the image forming apparatus 10 is in a remote operation mode of being remotely operated by the terminal device 20.

Figure 10:
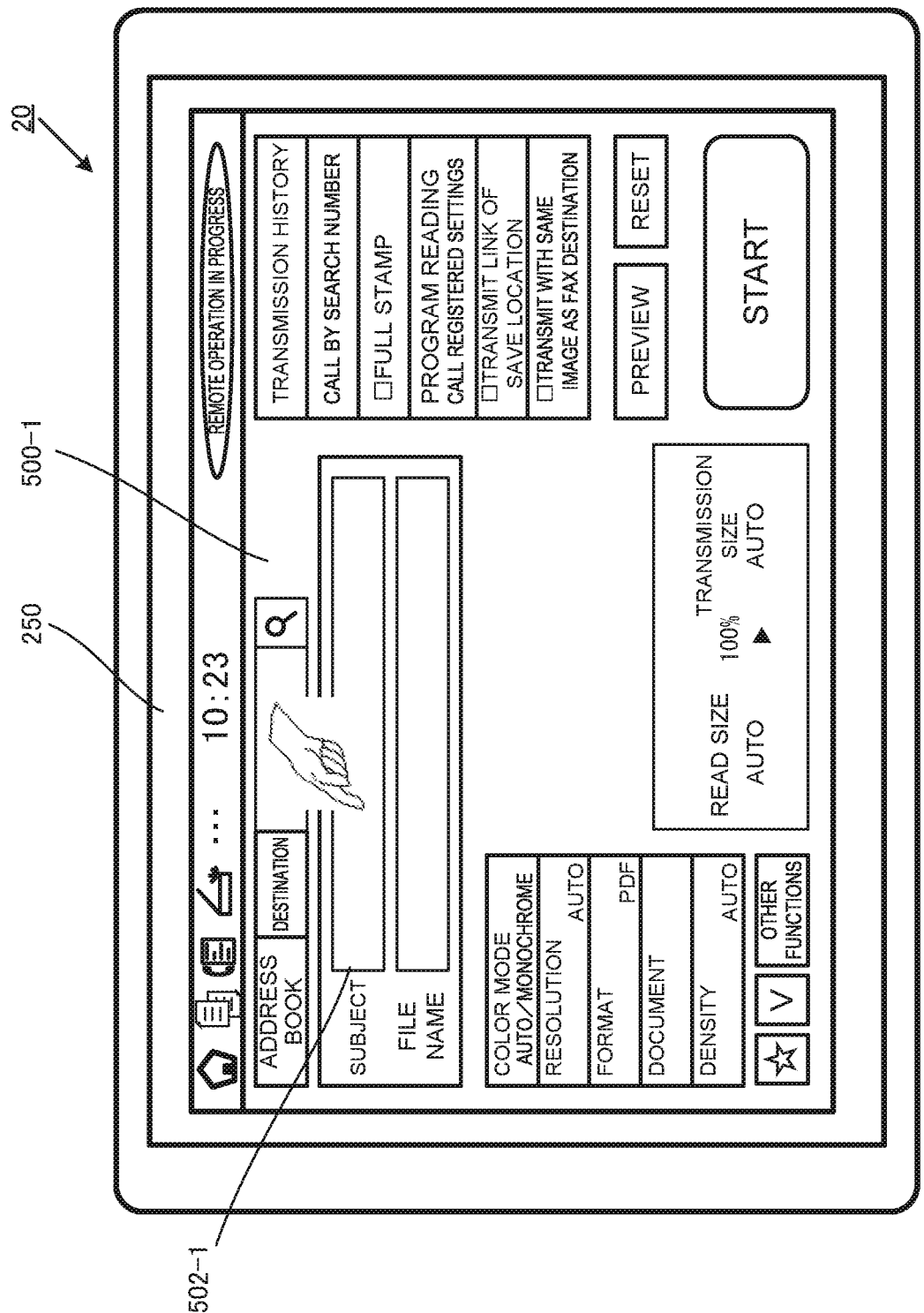
FIG. 10 is an explanatory diagram illustrating an operation screen displayed on a display of the terminal device according to the first embodiment.

Data on the operation screen is sent from the image forming apparatus 10 to the terminal device 20, and displayed as an operation screen 500-1 on the display 250 of the terminal device 20, as shown in FIG. 10. Here, when the user touches an input field 502-1 for the subject, an operation event signal thereof is sent to the image forming apparatus 10, and the image forming apparatus 10 assumes the input field 502 as an input target.

Figure 11:
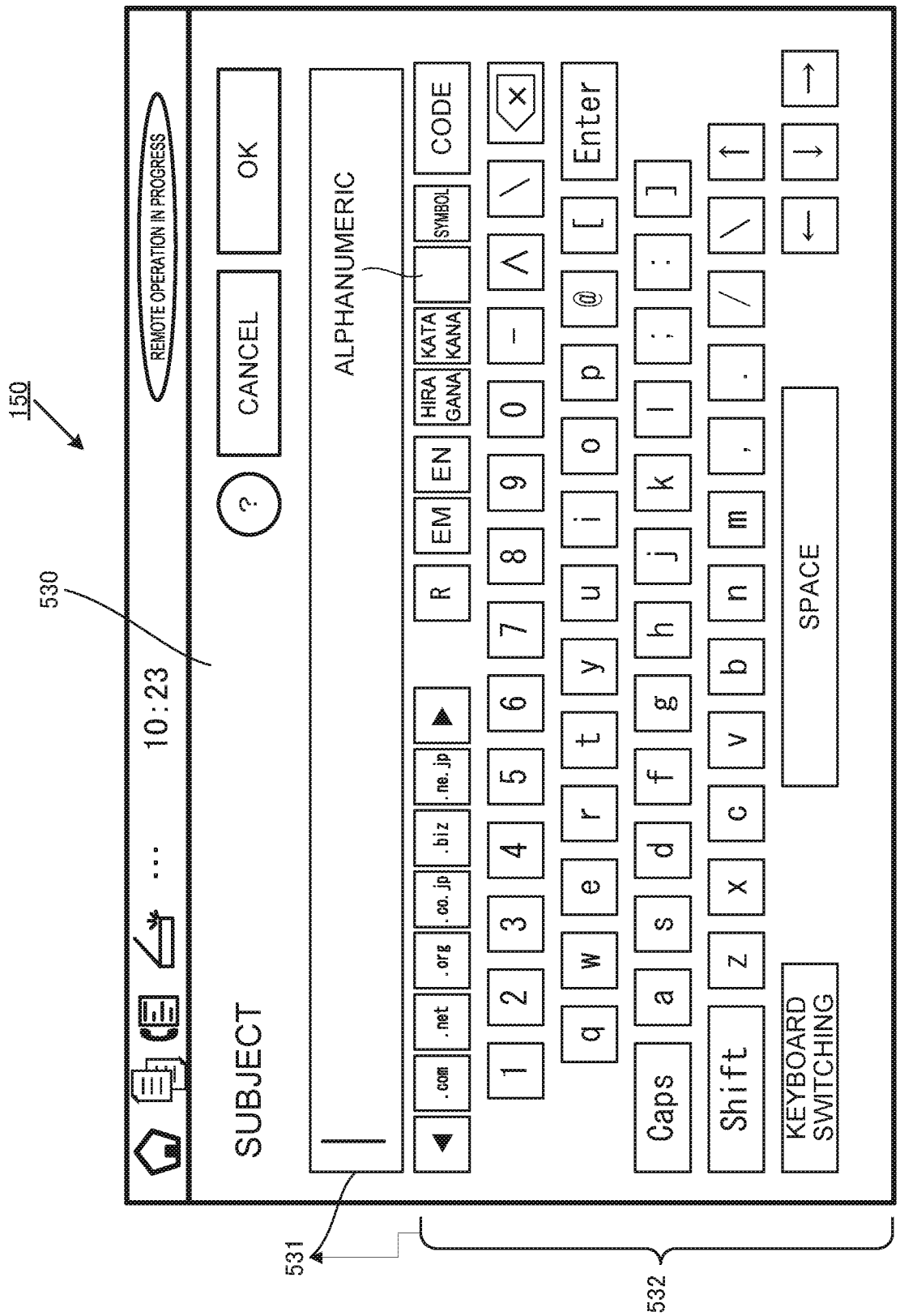
FIG. 11 is an explanatory diagram illustrating an operation screen for subject input displayed on the display of the image forming apparatus according to the first embodiment.

As shown in FIG. 11, the image forming apparatus 10 causes the operation screen displayed on the display 150 to be transitioned to an operation screen 530 for subject input. On the operation screen 530, an input field 531 for the subject, and a software keyboard 532 are displayed.

Figure 12:
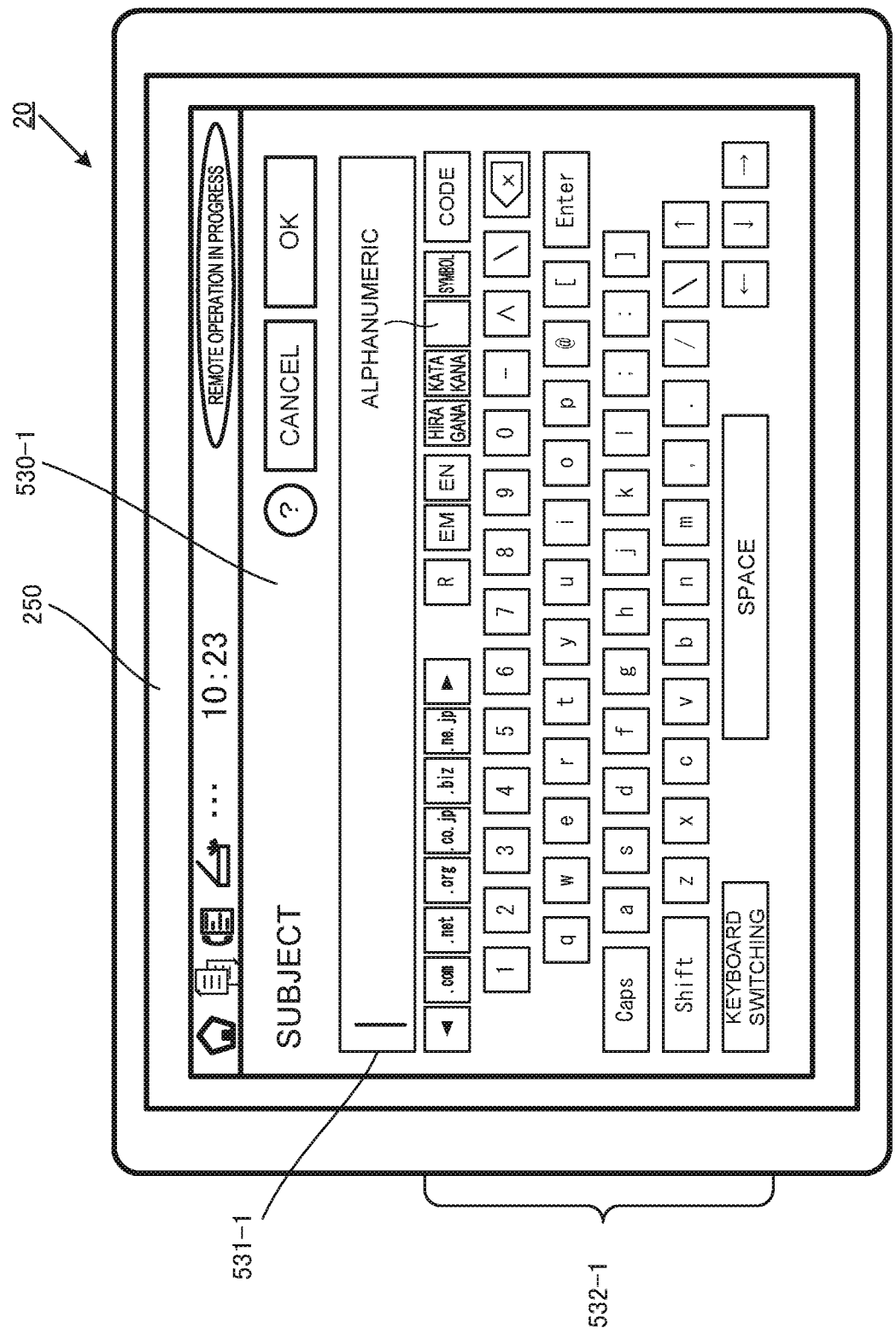
FIG. 12 is an explanatory diagram illustrating an operation screen for subject input displayed on the display of the terminal device according to the first embodiment.

The image forming apparatus 10 sends the changed operation screen data to the terminal device 20, and also sends an input function activation signal. The terminal device 20 displays, as shown in FIG. 12, an operation screen 530-1 which is based on the sent operation screen data on the display 250.

Figure 13:
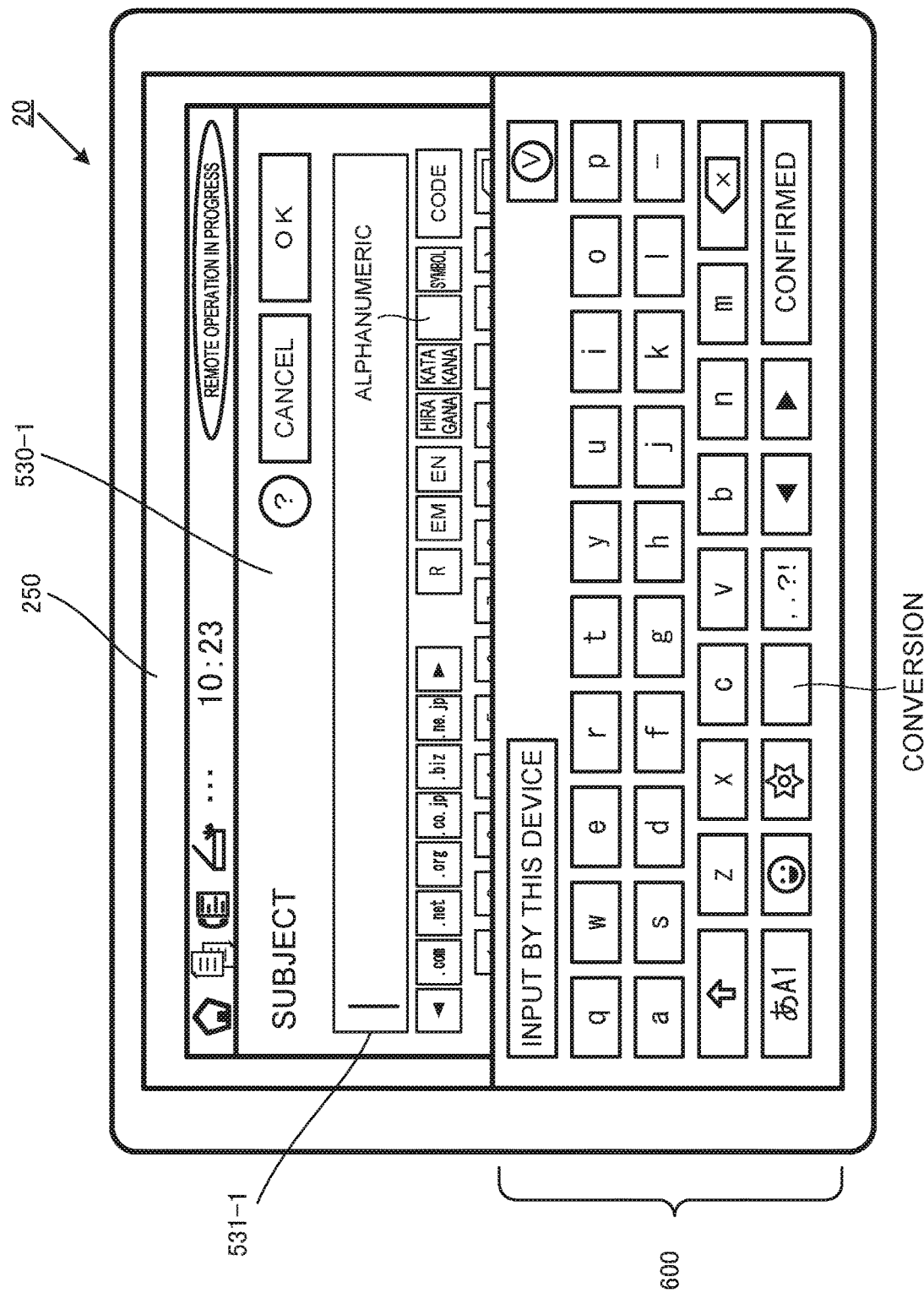
FIG. 13 is an explanatory diagram illustrating an operation screen for subject input and a software keyboard of a terminal device that are displayed on the display of the terminal device according to the first embodiment.

Since the input function activation signal has been sent to the terminal device 20, as shown in FIG. 13, the terminal device 20 displays a software keyboard 600 of the terminal device 20 over the operation screen 530-1 at a lower half side of the operation screen 530-1. A position of display of the software keyboard 600 may be anywhere on the display 250, and the position is freely movable by the user.

The user uses the software keyboard 600 to make an input, performs character conversion by using the IME (Input Method Editor) of the terminal device 20, and sends the input data to the image forming apparatus 10.

The image forming apparatus 10 displays the input data in the input field 531, and sends data on that operation screen 530 to the terminal device 20 to have the data reflected on the operation screen 530-1 that is the same as the operation screen 530.

1.5 Advantageous Effects

In this way, since the user can use the input function of a terminal device with which the user is familiar or which has sufficient functions, the operability is improved, and the input efficiency is also improved. In addition, there is no need to provide the input function of the terminal device in the image forming apparatus, and the cost of incorporating such a function can be reduced.

2. Second Embodiment

An image forming apparatus according to a second embodiment is an apparatus which, if the user performs an operation (for example, a long press or a double-click) to use an input function of a terminal device for an input field when the image forming apparatus receives a remote operation from the terminal device, activates the input function of the terminal device and performs an input operation by using that input function.

Since a system configuration and the configuration of each device are the same as those of the first embodiment, explanation thereof is omitted.

2.1 Flow of Processing

2.1.1 Processing of Image Forming Apparatus

Figure 14:
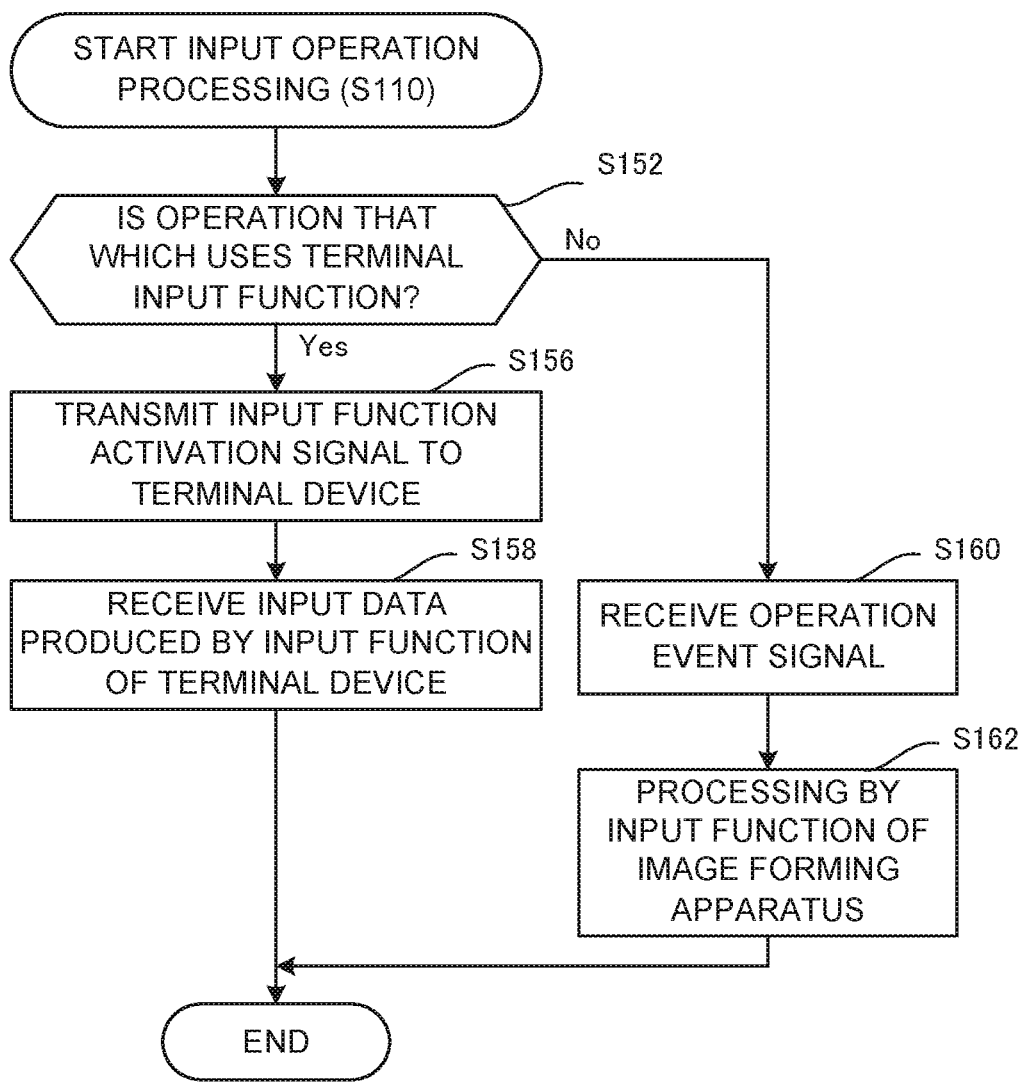
FIG. 14 is a flowchart showing input operation processing of an image forming apparatus according to a second embodiment.

Remote operation processing of the image forming apparatus according to the second embodiment is the same as that represented by the flowchart shown in FIG. 5, and thus explanation thereof is omitted. The input operation processing of the image forming apparatus in step S110 shown in FIG. 5 will be described. FIG. 14 is a flowchart showing input operation processing of the image forming apparatus according to the second embodiment.

A controller 100 of an image forming apparatus 10 performs input operation processing when an operation event signal transmitted from a terminal device 20 indicates an operation for specifying an input field (step S110). The controller 100 confirms whether the operation event signal indicates an operation that uses a terminal input function (step S152). If the operation is that which uses the terminal input function (step S152; Yes), the controller 100 transmits an input function activation signal to the terminal device 20 (step S156). The controller 100 receives input data produced by the terminal input function from the terminal device 20 via a communicator 170 (step S158).

If the operation is not that which uses the terminal input function (step S152; No), the controller 100 receives an operation event signal from the terminal device 20 via the communicator 170 (step S160), and performs processing by the input function of the image forming apparatus on the basis of the received signal (step S162).

2.1.2 Processing of Terminal Device

Figure 15:
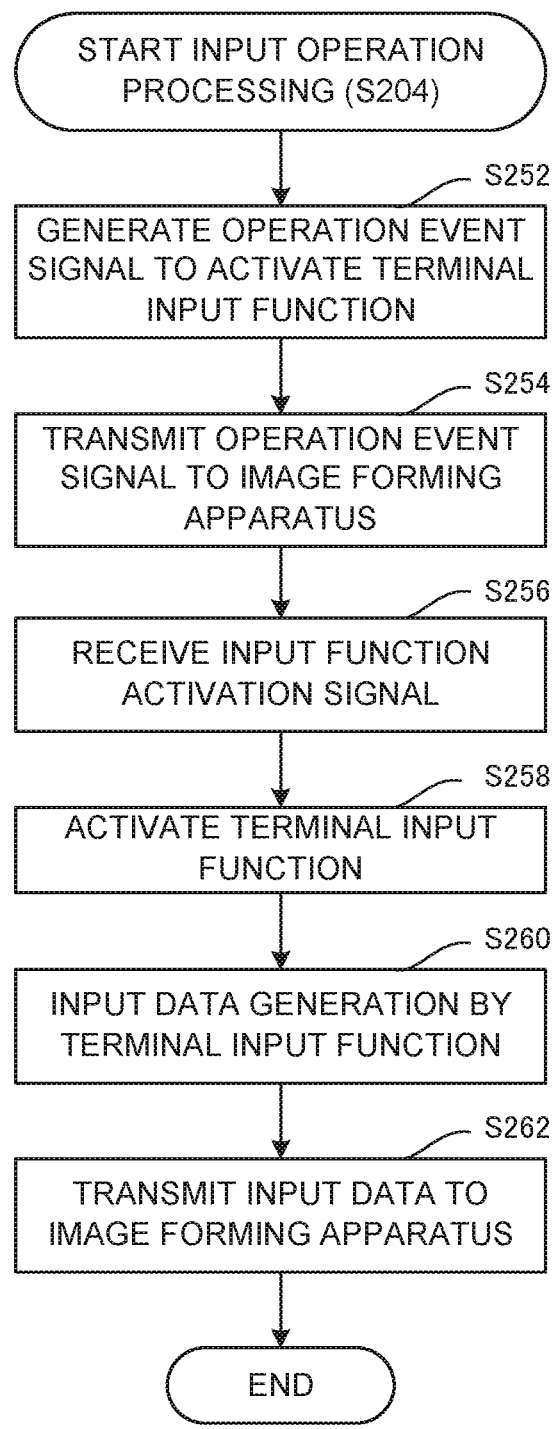
FIG. 15 is a flowchart showing input operation processing of a terminal device according to the second embodiment.

Remote operation processing of a terminal device according to the second embodiment is the same as that represented by the flowchart shown in FIG. 7, and thus explanation thereof is omitted. The input operation processing of the terminal device in step S204 shown in FIG. 7 will be described. FIG. 15 is a flowchart showing input operation processing of the terminal device according to the second embodiment.

A user uses an operator 260 of the terminal device 20 to perform an operation of using (activating) the input function of the terminal device 20. For example, operations such as a long press and a double touch are registered in advance. A controller 200 of the terminal device 20 receives the operation and generates an operation event signal to use (activate) the terminal input function (step S252). The controller 200 transmits the operation event signal to the image forming apparatus 10 via a communicator 270 (step S254).

The controller 200 receives an input function activation signal from the image forming apparatus 10 via the communicator 270 within a predetermined time period (step S256). The controller 200 activates the terminal input function (step S258). The controller 200 generates input data by an input operation from the operator 260 with the use of the terminal input function (step S260). Further, the controller 200 transmits the input data to the image forming apparatus 10 via the communicator 270 (step S262).

2.2 Operation Example

A specific example of the remote operation processing of the second embodiment will be described on the basis of an operation screen of FIG. 16.

Figure 16:
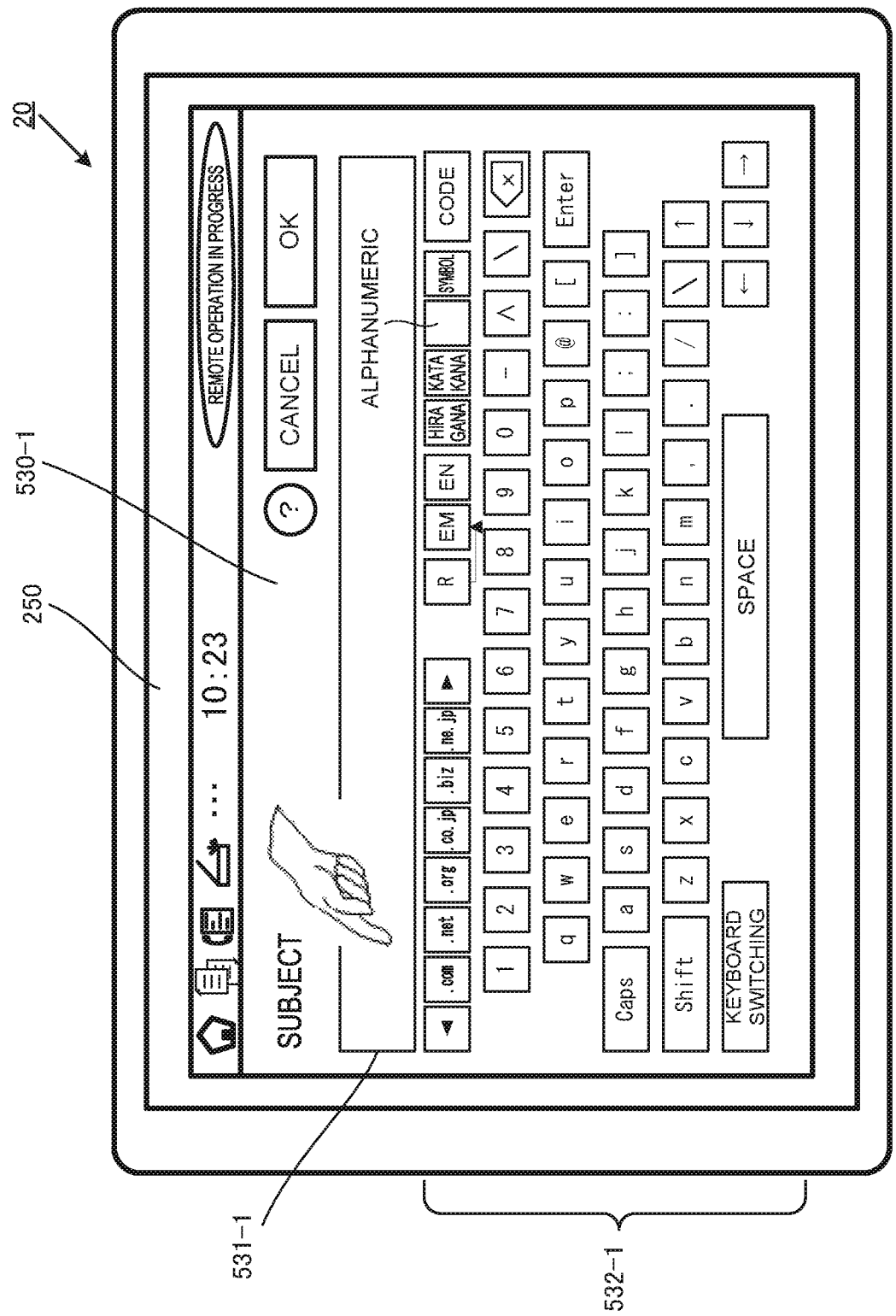
FIG. 16 is an explanatory diagram illustrating an operation screen for subject input displayed on a display of the terminal device according to the second embodiment.

FIG. 16 is the same as the display screen of the terminal device as illustrated in FIG. 12, and thus the configuration will not be described repeatedly. It is assumed that the user has touched an input field 531-1 for the subject with his/her finger and performed a long press. In a case where a long press is registered in the image forming apparatus 10 as an operation which triggers the terminal input function, an operation event signal of the operation is sent from the terminal device 20 to the image forming apparatus 10, and the image forming apparatus 10 sends an input function activation signal to the terminal device 20. Having received the signal, the terminal device 20 displays a software keyboard of the terminal device 20, as shown in FIG. 13. The user uses the software keyboard, and performs character conversion by the IME of the terminal device 20.

If the user wishes to use the input function of the image forming apparatus, the use of the input function of the image forming apparatus may be enabled by way of a different operation such as a short one-touch operation performed in the input field. As regards switching of the input function, the operation is not limited to the above, and the way of performing each operation only needs to be set.

2.3 Advantageous Effects

In this way, the user can switch the input function for an input field of the image forming apparatus to the input function of the terminal device with which the user is familiar by a simple operation. Therefore, the operability is improved, and the input efficiency is also improved. In addition, there is no need to provide the input function of the terminal device in the image forming apparatus, and the cost of incorporating such a function can be reduced.

3. Third Embodiment

An image forming apparatus according to a third embodiment is an apparatus which performs a display for an input field in which the input function of a terminal device should be used by indicating this information.

Since a system configuration, the configuration of each device, and the flow of processing are the same as those of the first and second embodiments, explanation thereof is omitted.

3.1 Operation Example

Figure 17:
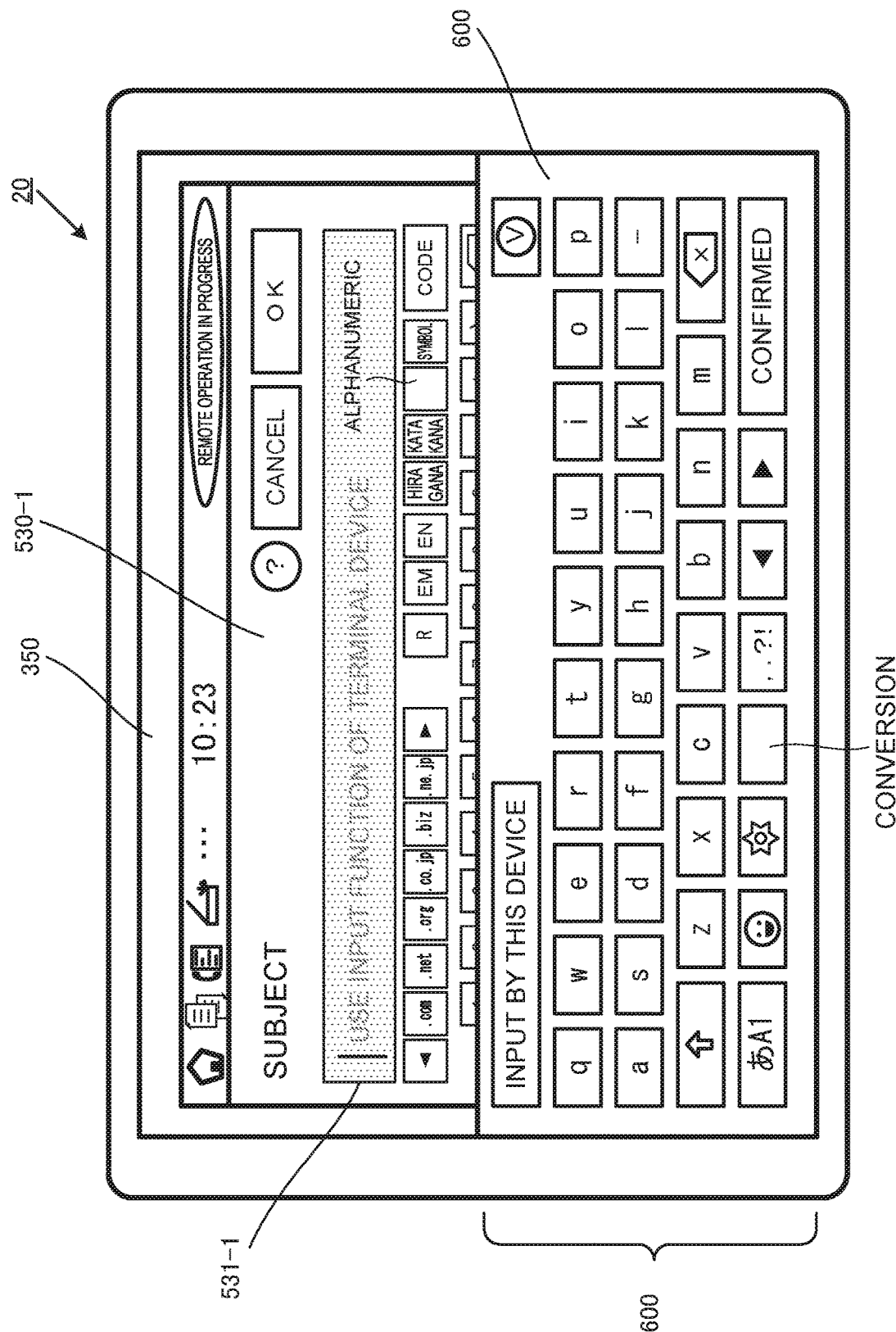
FIG. 17 is an explanatory diagram illustrating an operation screen for subject input and a software keyboard of a terminal device that are displayed on a display of a terminal device according to a third embodiment.

FIG. 17 is an explanatory diagram illustrating an operation screen for subject input and a software keyboard of a terminal device that are displayed on a display of a terminal device according to the third embodiment.

The operation screen of FIG. 17 is the same as the operation screen of the terminal device 20 of FIG. 13, and thus explanation of the configuration is omitted.

The color of an input field 531-1 for the subject is changed, and furthermore, an indication "Use input function of terminal device" is displayed in the input field with translucent characters. The user is notified that the input field for the subject uses the input function of the terminal device.

3.2 Advantageous Effects

In this way, by indicating in the input field that the input function of the terminal device is to be used, the user understands that the input function of the terminal device can be used, and can perform an operation efficiently without being confused.

4. Modification Example

The embodiments of the present invention have been described in detail with reference to the accompanying drawings, but the specific configuration is not limited to the configurations of the present embodiments, and designs and the like to the extent that they do not depart from the gist of the present invention are also included in the scope of the claims.

In addition, the program to be operated on each of the devices in the embodiments is a program which controls the CPU or the like (i.e., a program which makes a computer function) so as to implement the functions of the above-described embodiments. Moreover, information handled by these devices is temporarily stored in a temporary storage device (for example, a RAM) when being processed, and then stored in various storage devices such as a ROM and an HDD, where the information is read, corrected, and written by the CPU as needed.

Here, a recording medium for storing the program may be any as long as it is a non-transitory recording medium such as a semiconductor medium (for example, a ROM, a non-volatile memory card, and the like), an optical recording medium/magneto-optical recording medium (for example, a DVD (Digital Versatile Disk), an MO (Magneto Optical Disk), an MD (Mini Disk), a CD (Compact Disk), a BD (Blu-ray Disc [registered trademark]), and the like), or a magnetic recording medium (for example, a magnetic tape, a flexible disk, and the like). Further, not only are the functions of the above-described embodiments implemented by execution of the loaded program, but the functions of the present invention may also be implemented by processing performed in cooperation with an operating system or other application programs, etc., on the basis of the instructions of the program.

Furthermore, if the program is to be distributed to the market, the program may be stored in a portable recording medium for distribution, or transferred to a server computer connected via a network such as the Internet. In this case, a storage device of the server computer is also included in the present invention as a matter of course.

In addition, a part of or all of the devices in the above-described embodiments may be realized as an LSI (Large Scale Integration), which is typically an integrated circuit. Respective functional blocks of the devices may be individually formed as a chip, or may be partially or wholly integrated and formed as a chip. In addition, a method of achieving the integrated circuit is not limited to the LSI, but may be realized by a dedicated circuit or by a general-purpose processor. Moreover, when a technology for achieving the integrated circuit which substitutes for the LSI emerges as a result of the progress of the semiconductor technology, it is of course possible to apply the integrated circuit based on such a technology.

What is claimed is:

1. An image forming apparatus which is remotely operated by a terminal device, comprising:
   a display which displays an operation screen;
   a communicator which transmits and receives data or signals to and from a terminal device; and
   a controller, wherein
   the controller transmits, to the terminal device, via the communicator,
   the controller transmits, to the terminal device, an activation signal which activates an input function of the terminal device, and receives, from the terminal device, input data inputted using the input function of the terminal device activated when an input field using the input function of the terminal device is selected in the operation screen displayed on the terminal device, and
   when an input field which does not use the input function of the terminal device is selected in the operation screen displayed on the terminal device, the controller performs a process by the input function of the image forming apparatus based on an operation signal received from the terminal device via the communicator.

2. The image forming apparatus according to claim 1, wherein
   the controller transmits the activation signal, which activates the input function, to the terminal device when the operation related to the input field is an operation to specify an input field of the terminal device.

3. The image forming apparatus according to claim 1, wherein
   the controller transmits the activation signal, which activates the input function, to the terminal device when the operation related to the input field is an operation to use an input function of the terminal device.

4. The image forming apparatus according to claim 1, wherein the input field is set in advance as an input field that uses an input function of the terminal device.

5. The image forming apparatus according to claim 1, wherein the controller further generates a notification indicating use of an input function of the terminal device.

6. A remote operation control method for an image forming apparatus which is operated by a terminal device, the remote operation control method comprising:
   displaying an operation screen;
   transmitting and receiving data or signals to and from the terminal device; and
   transmitting, to the terminal device, via communicator, an activation signal which activates an input function of the terminal device and receiving, from the terminal device, input data inputted using the input function of the terminal device activated when an input field using the input function of the terminal device is selected in the operation screen displayed on the terminal device; and
   performing a process by the input function of the image forming apparatus based on an operation signal received from the terminal device via the communicator when an input field which does not use the input function of the terminal device is selected in the operation screen displayed on the terminal device.

7. The remote operation control method according to claim 6, wherein
   the activation signal, which activates the input function, is transmitted to the terminal device when the operation related to the input field is an operation to specify an input field of the terminal device.

8. The remote operation control method according to claim 6, wherein
   the activation signal, which activates the input function, is transmitted to the terminal device when the operation related to the input field is an operation to use an input function of the terminal device.

9. An operation method for an image forming apparatus comprising:
   displaying on the image forming apparatus a first operation screen that is used for an operation of the image forming apparatus;
   transmitting, to a terminal device, data of the first operation screen, wherein the first operation screen is displayed on the terminal device;
   based on selecting an input field using an input function of the terminal device in the first operation screen displayed on the terminal device, transmitting, to the terminal device, an activation signal activating the input function of the terminal device and data of a second operation screen;
   displaying the second operation screen on the terminal device;
   receiving, from the terminal device, input data inputted in the second operation screen; and
   receiving, from the terminal device, input data inputted in the first operation screen displayed on the terminal device when an input field which does not use the input function of the terminal device is selected in the first operation screen displayed on the terminal device.

10. The operation method for the image forming apparatus according to claim 9, wherein when the input function is activated in the terminal device, the second operation screen is displayed on the terminal device overlaying, at least partially, the first operation screen displayed on the terminal device.

11. The operation method for the image forming apparatus according to claim 9, wherein the second operation screen contains a software keyboard.

12. The operation method for the image forming apparatus according to claim 9, wherein
   the first operation screen displayed on the terminal device contains a first software keyboard,
   when the operation related to the input field included in the first operation screen is performed, an input function of the terminal device is activated,
   when the input function of the terminal device is activated, the terminal device displays the second operation screen such that the second operation screen overlays, at least partially, the first operation screen, and the second operation screen contains a second software keyboard.

\* \* \* \* \*